United States Patent
Rui

(10) Patent No.: US 8,352,660 B2
(45) Date of Patent: Jan. 8, 2013

(54) PORTABLE COMPUTER CAPABLE OF CONNECTING DISCRETE GRAPHICS CARD TO PCIE CONTROLLER BY COMBINATION SWITCH

(75) Inventor: Yi Rui, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 194 days.

(21) Appl. No.: 12/845,707

(22) Filed: Jul. 28, 2010

(65) Prior Publication Data

US 2011/0219165 A1  Sep. 8, 2011

(30) Foreign Application Priority Data

Mar. 4, 2010 (CN) .......................... 2010 1 0117952

(51) Int. Cl.
*G06F 13/14* (2006.01)

(52) U.S. Cl. ........ 710/300; 710/302; 710/303; 710/304; 710/313; 710/316

(58) Field of Classification Search .......... 710/300–317, 710/62–64; 713/300–340
See application file for complete search history.

(56) References Cited

U.S. PATENT DOCUMENTS

| | | | | |
|---|---|---|---|---|
| 6,956,579 B1 * | 10/2005 | Diard et al. | ................... | 345/537 |
| 6,985,152 B2 * | 1/2006 | Rubinstein et al. | ........... | 345/520 |
| 7,099,969 B2 * | 8/2006 | McAfee et al. | ............... | 710/107 |
| 7,478,187 B2 * | 1/2009 | Knepper et al. | ............... | 710/300 |
| 7,600,112 B2 * | 10/2009 | Khatri et al. | ................... | 713/100 |
| 7,617,248 B2 * | 11/2009 | Ditcharo et al. | ..................... | 1/1 |
| 7,865,629 B1 * | 1/2011 | Tantos et al. | ................... | 710/11 |
| 2006/0098020 A1 * | 5/2006 | Shen et al. | ................... | 345/520 |
| 2007/0139423 A1 * | 6/2007 | Kong et al. | ................... | 345/502 |
| 2007/0163632 A1 * | 7/2007 | Chang | ............... | 135/21 |
| 2008/0222340 A1 * | 9/2008 | Danilak | ....................... | 710/307 |
| 2009/0066704 A1 * | 3/2009 | Daniel et al. | .................. | 345/501 |
| 2011/0057939 A1 * | 3/2011 | Glen et al. | ................... | 345/522 |

* cited by examiner

*Primary Examiner* — Raymond Phan
(74) *Attorney, Agent, or Firm* — Altis Law Group, Inc.

(57) ABSTRACT

The portable computer includes a PCIe controller, a DisplayPort connector, and a combination switch. The DisplayPort connector includes a hot plug pin. The combination switch is connected between the PCIe controller and the DisplayPort connector. The combination switch includes a selecting pin electronically connected to the hot plug pin. When the DisplayPort connector is electronically coupled to a discrete graphics card using PCIe, the hot plug pin sends a hot plug voltage signal to the selecting pin, and the combination switch electronically connects the DisplayPort connector to the PCIe controller after receiving the signal.

20 Claims, 2 Drawing Sheets

PORTABLE COMPUTER CAPABLE OF CONNECTING DISCRETE GRAPHICS CARD TO PCIE CONTROLLER BY COMBINATION SWITCH

BACKGROUND

1. Technical Field

The present disclosure relates to a portable computer.

2. Description of Related Art

The portable computer often includes an integrated graphics card. However, the integrated graphics card is inadequate for processing high-quality graphics. Thus, a discrete graphics card is needed at this time. But portable computers have no interface for attaching the discrete graphics card, and the portable computer cannot apply an additional interface for attaching discrete graphics card because it will increase the size of the portable computer.

What is needed, therefore, is a new portable computer to overcome the above-described problem.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments.

DETAILED DESCRIPTION

Embodiments of the present disclosure will now be described in detail below, with reference to the accompanying drawings.

Figure 1:
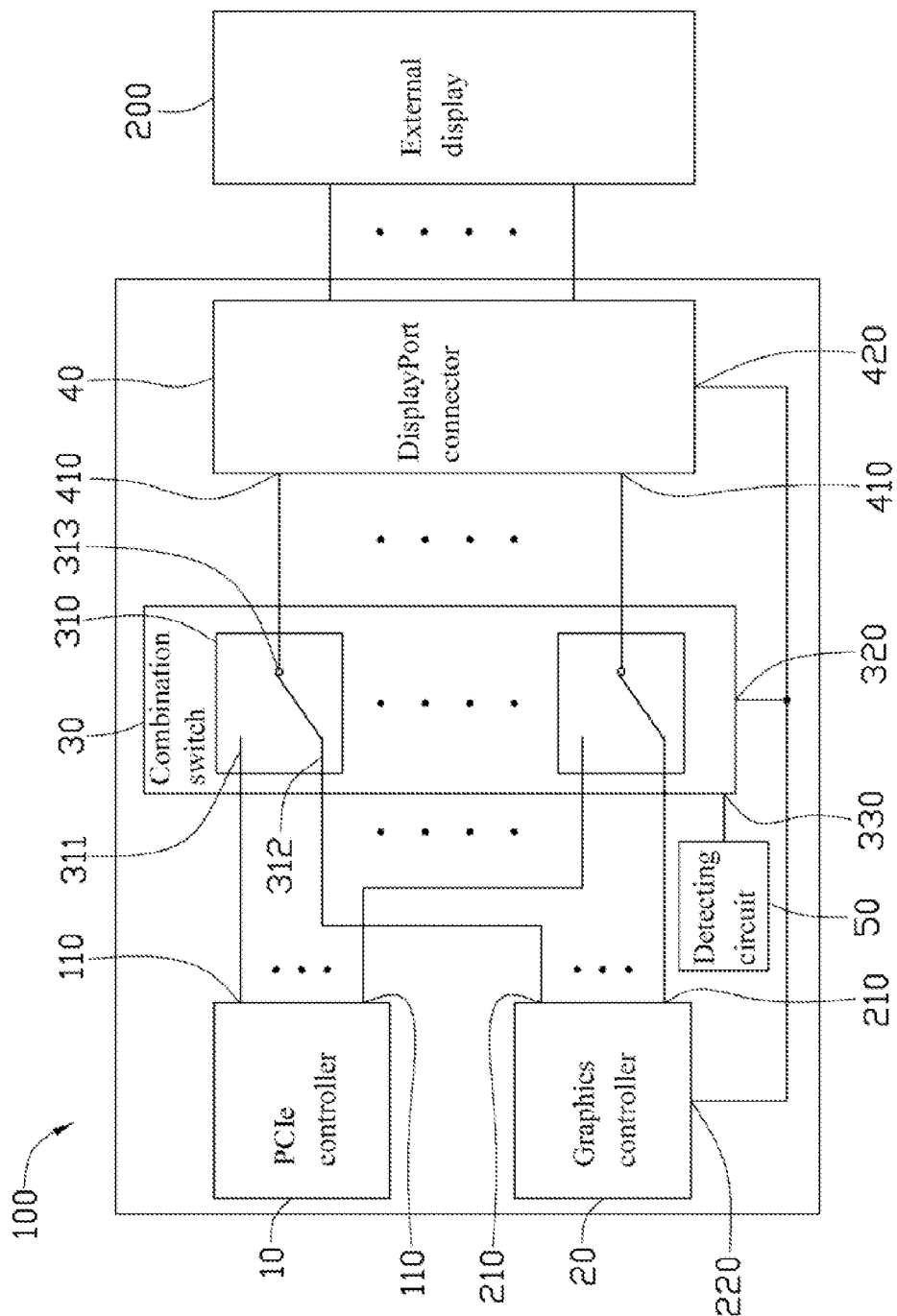
FIG. 1 is a schematic view of a portable computer connected to an external display according to an exemplary embodiment.
Figure 2:
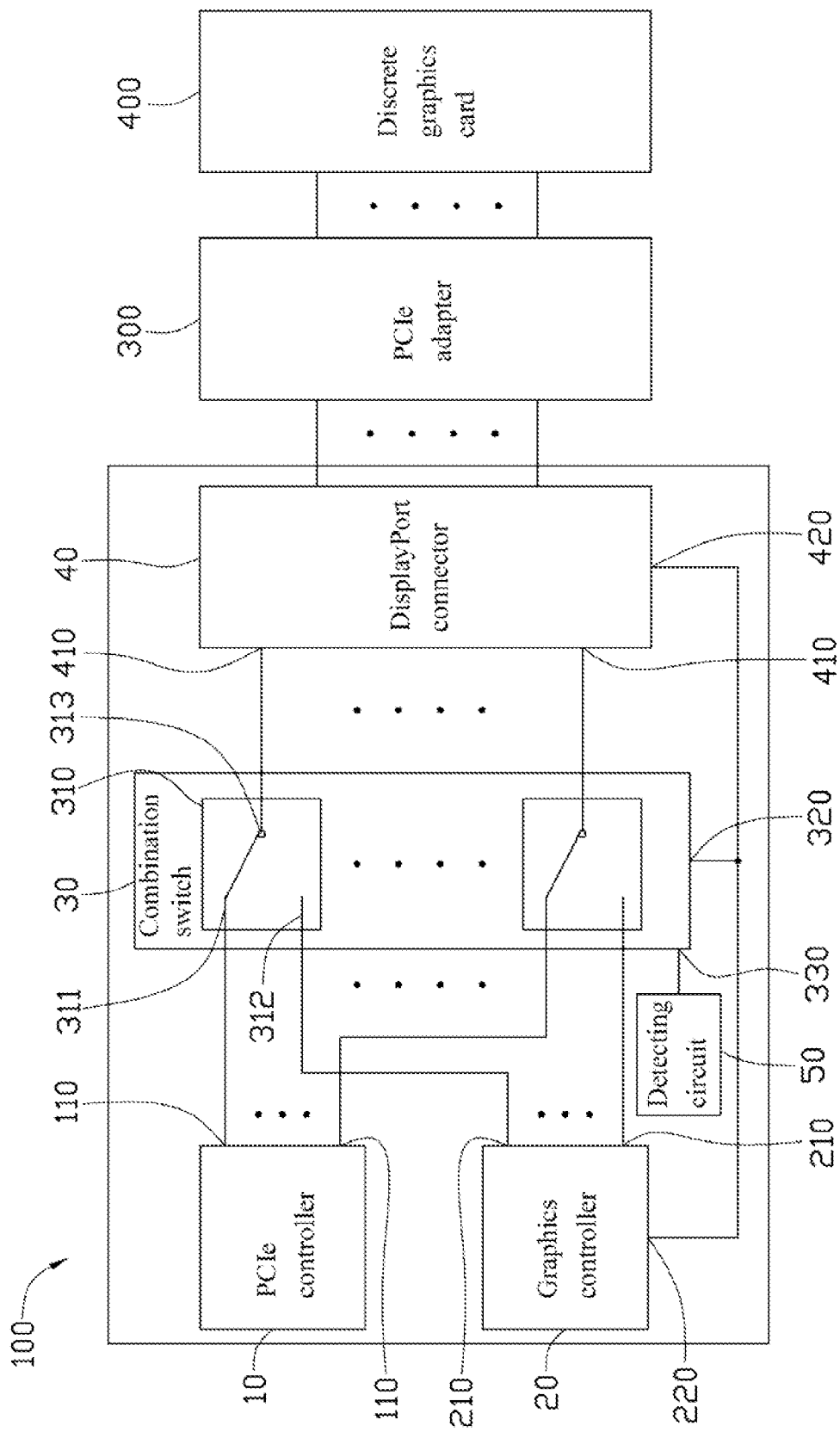
FIG. 2 is similar to FIG. 1, but showing the portable computer connected to a discrete graphics card.

Referring to FIGS. 1 and 2, a portable computer 100 according to an exemplary embodiment is shown. The computer 100 includes a Peripheral Component Interconnect Express (PCIe) controller 10, a graphics controller 20, a combination switch 30, a DisplayPort connector 40, and a detecting circuit 50.

The PCIe controller 10 is configured for attaching PCIe device to the computer system. The PCIe controller 10 provides at least one lane PCIe interface. In the present embodiment, the PCIe controller 10 provides two PCIe interfaces lanes. The PCIe controller 10 includes twelve PCIe pins 110.

The graphics controller 20 is configured for outputting video and graphics to an external display 200. The graphics controller 20 uses DisplayPort interface. DisplayPort is a digital display interface standard put forth by the Video Electronics Standards Association (VESA) since 2006. In the present embodiment, the graphics controller 20 includes twelve controller pins 210 and a detecting pin 220. The controller pins 210 are configured for outputting video and graphics to the external display 200. The detecting pin 220 is configured for detecting hot plug status.

The DisplayPort connector 40 is used to receive video and graphics signals from the graphics controller 20 and output the signals to the external display 200. In the present embodiment, the DisplayPort connector 40 is also used as an interface to the discrete graphics card 400, thus, the portable computer 100 does not need an additional interface for connecting the discrete graphics card 400. In the present embodiment, the DisplayPort connector 40 is connected to the discrete graphics card 400 by a PCIe adaptor 300 using DisplayPort interface. The DisplayPort connector 40 includes twelve DP pins 410 and a DP hot plug pin 420. The DP pins 410 are connected to the combination switch 30. The DP hot plug pin 420 is electronically connected to the detecting pin 220 of the graphics controller 20.

The combination switch 30 includes twelve changeover switches 310, a selecting pin 320, and a latch pin 330. The changeover switches 310 are high-speed signal switches. Each changeover switch 310 includes a first pin 311, a second pin 312, and a third pin 313. The first pin 311 is electronically connected to the corresponding PCIe pin 110. The second pin 312 is electronically connected to the corresponding controller pin 210. The third pin 313 is electronically connected to the DP pins 410.

The selecting pin 320 is configured for setting the diverting direction of the changeover switches 310 to selectively connect the DisplayPort connector 40 to the PCIe controller 110 or the graphics controller 20. The selecting pin 320 is electronically connected to the DP hot plug pin 420 and the detecting pin 220.

When the discrete graphics card 400 or the external display 200 is connected to the DisplayPort Connector 40, the DP hot plug pin 420 delivers a corresponding hot plug voltage signal. The voltage of a hot plug signal from the external display 200 is higher than that from a discrete graphics card 400. In the present embodiment, the hot plug signal from the discrete graphics card 400 is a first hot plug voltage signal, the hot plug signal from the external display 200 is a second hot plug voltage signal. If the DisplayPort connector 40 is connected to the discrete graphics card 400, the selecting pin 320 will receive a first hot plug voltage signal from the DP hot plug pin 420, the changeover switch 310 will connect the first pin 311 to the third pin 313 for connecting the PCIe controller 10 to the discrete graphics card 400. If the DisplayPort connector 40 is connected to the external display 200, the selecting pin 320 will receive a second hot plug voltage signal from the DP hot plug pin 420, the changeover switch 310 will connect the second pin 312 to the third pin 313 for connecting the graphics controller 20 to the external display 200. The detecting pin 220 will receive a second hot plug voltage signal from the DP hot plug pin 420, and the graphics controller 20 will output video and graphics to the external display 200.

The latch pin 330 is configured for locking the changeover switch 310 at a stable status, thus to avoid uncertain changeover of the changeover switch 310. The latch pin 330 is electronically connected to and controlled by the detecting circuit 50.

The detecting circuit 50 is configured for detecting the stable status of the power supply (not show) of the portable computer 100. If the status of the power supply is stable, the detecting circuit 50 sends a locking signal to the latch pin 330. The detecting circuit 50 is a conventional power supply detecting circuit in the portable computers. In the present embodiment, the detecting circuit 50 is a voltage detection circuit. When the detecting circuit 50 detects the working voltage of the portable computer reaching the rated voltage of the portable computer, the detecting circuit 50 sends a locking signal to the latch pin 330.

In the present embodiment, the portable computer 100 is not only capable of connecting the external display 200 to the graphics controller 20, but capable of connecting the discrete graphics card 400 to the PCIe controller 10 by the combination switch 30 without compromising the compact size of the portable computer 100.

While certain embodiments have been described and exemplified above, various other embodiments will be apparent to those skilled in the art from the foregoing disclosure. The present disclosure is not limited to the particular embodiments described and exemplified, and the embodiments are capable of considerable variation and modification without departure from the scope of the appended claims.

What is claimed is:

1. A portable computer, comprising:
   a PCIe controller configured for attaching a PCIe device to the portable computer;
   a DisplayPort connector comprising a hot plug pin; and
   a combination switch connecting the PCIe controller to the DisplayPort connector, and comprising a selecting pin electronically connected to the hot plug pin, wherein when the DisplayPort connector is electronically coupled to a discrete graphics card, the hot plug pin outputs a first hot plug voltage signal, the selecting pin receives the first hot plug voltage signal, and controls the combination switch to electronically connect the DisplayPort connector to the PCIe controller.

2. The portable computer as claimed in claim 1, wherein when the DisplayPort connector is electronically coupled to an external display via the discrete graphics card, the hot plug pin outputs the first hot plug voltage signal.

3. The portable computer as claimed in claim 1, further comprising a graphics controller connected to the combination switch, wherein when the DisplayPort connector is electronically coupled to an external display not via the discrete graphics card, the hot plug pin outputs a second hot plug voltage signal, the selecting pin receives the second hot plug voltage signal, and controls the combination switch to electronically connect the DisplayPort connector to the graphics controller instead of electronically connecting the DisplayPort connector to the PCIe controller.

4. The portable computer as claimed in claim 1, wherein the combination switch further comprises a latch pin configured for locking the combination switch at a stable status and avoiding uncertain changeover of the changeover switch.

5. The portable computer as claimed in claim 3, wherein the combination switch comprises a number of changeover switches, each changeover switch comprises a first pin, a second pin, and a third pin, the first pin is electronically connected to the PCIe controller, the second pin is electronically connected to the graphics controller, the third pin is electronically connected to the DisplayPort connector, if the DisplayPort connector is electronically coupled to the discrete graphics card, each changeover switch connects the first pin to the third pin respectively, and if the DisplayPort connector is electronically coupled to the external display not via the discrete graphics card, each changeover switch connects the second pin to the third pin.

6. The portable computer as claimed in claim 3, wherein the graphics controller comprises a detecting pin connected to the selecting pin and the hot plug pin, if the DisplayPort connector is electronically coupled to the external display not via the discrete graphics card, the detecting pin receives the second hot plug voltage signal from the hot plug pin, and the graphics controller outputs video and graphics to the external display according to the second hot plug voltage signal.

7. The portable computer as claimed in claim 4, further comprising a detecting circuit electronically connected to the latch pin, wherein when the detecting circuit detects the working voltage of the portable computer reaching the rated voltage of the portable computer, the detecting circuit controls the latch pin to lock the combination switch.

8. The portable computer as claimed in claim 5, wherein the changeover switches are signal switches.

9. The portable computer as claimed in claim 5, wherein the PCIe controller comprises a number of PCIe pins electronically connected to the first pins respectively, the graphics controller comprises a number of controller pins electronically connected to the second pins respectively, and the DisplayPort connector comprises a number of DP pins electronically connected to the third pins respectively.

10. The portable computer as claimed in claim 8, wherein the changeover switches are high-speed signal switches.

11. A portable computer, comprising:
    a PCIe controller;
    a graphics controller;
    a DisplayPort connector comprising a hot plug pin, the hot plug pin being configured to output a first hot plug voltage signal if the DisplayPort connector is electronically connected to a discrete graphics card, and to output a second hot plug voltage signal if the DisplayPort connector is electronically connected to an external display not via the discrete graphics card; and
    a combination switch comprising a selecting pin electronically connected to the hot plug pin, the combination switch being configured to electrically connect the DisplayPort connector to the PCIe controller if the selecting pin receives the first hot plug voltage signal from the hot plug pin, and to electrically connect the DisplayPort connector to the graphics controller if the selecting pin receives the second hot plug voltage signal from the hot plug pin.

12. The portable computer as claimed in claim 11, wherein the hot plug pin is configured to output the first hot plug voltage signal if the DisplayPort connector is electronically connected to the external display via the discrete graphics card.

13. The portable computer as claimed in claim 11, wherein the combination switch further comprises a latch pin configured for locking the combination switch at a stable status and avoiding uncertain changeover of the changeover switch.

14. The portable computer as claimed in claim 13, further comprising a detecting circuit electronically connected to the latch pin, wherein when the detecting circuit detects the working voltage of the portable computer reaching the rated voltage of the portable computer, the detecting circuit controls the latch pin to lock the combination switch.

15. The portable computer as claimed in claim 11, wherein the combination switch comprises a number of changeover switches, each changeover switch comprises a first pin, a second pin, and a third pin, the first pin is electronically connected to the PCIe controller, the second pin is electronically connected to the graphics controller, the third pin is electronically connected to the DisplayPort connector, if the DisplayPort connector is electronically coupled to the discrete graphics card, each changeover switch connects the first pin to the third pin respectively, if the DisplayPort connector is electronically coupled to the external display not via the discrete graphics card, each changeover switch connects the second pin to the third pin respectively.

16. The portable computer as claimed in claim 15, wherein the changeover switches are signal switches.

17. The portable computer as claimed in claim 16, wherein the changeover switches are high-speed signal switches.

18. The portable computer as claimed in claim 15, wherein the PCIe controller comprises a number of PCIe pins electronically connected to the first pins respectively, the graphics controller comprises a number of controller pins electronically connected to the second pins respectively, and the DisplayPort connector comprises a number of DP pins electronically connected to the third pins respectively.

19. A portable computer, comprising:
  a PCIe controller configured for attaching a PCIe device to the portable computer;
  a DisplayPort connector comprising a hot plug pin; and
  a combination switch connecting the PCIe controller to the DisplayPort connector, and comprising a selecting pin electronically connected to the hot plug pin, wherein when the DisplayPort connector is electronically coupled to an external display via a discrete graphics card, the hot plug pin outputs a first hot plug voltage signal, the selecting pin receives the first hot plug voltage signal, and controls the combination switch to electronically connect the DisplayPort connector to the PCIe controller.

20. The portable computer as claimed in claim 19, further comprising a graphics controller connected to the combination switch, wherein when the DisplayPort connector is electronically coupled to the external display not via the discrete graphics card, the hot plug pin outputs a second hot plug voltage signal, and the selecting pin receives the second hot plug voltage signal, and controls the combination switch to electronically connect the DisplayPort connector to the graphics controller instead of electronically connecting the DisplayPort connector to the PCIe controller.

* * * * *